United States Patent
Lee

(10) Patent No.: US 9,904,857 B2
(45) Date of Patent: Feb. 27, 2018

(54) APPARATUS AND METHOD FOR DETECTING OBJECT FOR VEHICLE

(71) Applicant: HYUNDAI MOBIS Co., Ltd., Yongin-si, Gyeonggi-do (KR)

(72) Inventor: Sung Joo Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 111 days.

(21) Appl. No.: 14/885,587

(22) Filed: Oct. 16, 2015

(65) Prior Publication Data
US 2016/0132734 A1    May 12, 2016

(30) Foreign Application Priority Data
Nov. 7, 2014 (KR) .......... 10-2014-0154563

(51) Int. Cl.
| | | |
|---|---|---|
| *G06K 9/00* | (2006.01) | |
| *B60R 11/04* | (2006.01) | |
| *G06T 7/11* | (2017.01) | |

(52) U.S. Cl.
CPC .......... *G06K 9/00805* (2013.01); *B60R 11/04* (2013.01); *G06K 9/00791* (2013.01); *G06K 9/00825* (2013.01); *G06T 7/11* (2017.01); *G06T 2207/10016* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 6,487,303 | B1 * | 11/2002 | Yamaguchi .............. | G06T 7/74 382/103 |
| 7,741,961 | B1 * | 6/2010 | Rafii ..................... | B60Q 9/005 340/435 |
| 9,607,400 | B2 * | 3/2017 | Guan ...................... | G06T 7/20 |
| 2007/0211919 | A1 * | 9/2007 | Nagaoka ............ | G06K 9/00369 382/104 |
| 2009/0128652 | A1 * | 5/2009 | Fujii .................... | G06T 7/254 348/222.1 |
| 2012/0194680 | A1 * | 8/2012 | Ishii ................... | G06K 9/00362 348/148 |
| 2012/0213412 | A1 * | 8/2012 | Murashita ............. | G06T 7/0042 382/104 |

(Continued)

OTHER PUBLICATIONS

Kamijo et al., "Pedestrian Detection Algorithm for On-board Cameras of Multi View Angles", 2010 IEEE Intelligent Vehicles Symposium, Jun. 21-24, 2010, pp. 973-980.*

*Primary Examiner* — Matthew Bella
*Assistant Examiner* — Jose M Torres
(74) *Attorney, Agent, or Firm* — Paratus Law Group, PLLC

(57) ABSTRACT

Disclosed are an apparatus and a method for detecting an object for a vehicle, the apparatus including: a camera unit configured to output a surrounding image of a vehicle; an object candidate extracting unit configured to extract an object candidate from the output surrounding image of the vehicle; a height reference filtering unit configured to output a filtered image by excluding an object having a height equal to or smaller than a threshold value from the extracted object candidate; and an object recognizing unit configured to detect a specific object from the output filtered image.

2 Claims, 3 Drawing Sheets

(56) References Cited

U.S. PATENT DOCUMENTS

| | | | | |
|---|---|---|---|---|
| 2012/0320212 A1* | 12/2012 | Aimura | .................... | B60R 1/00 |
| | | | | 348/148 |
| 2013/0027196 A1* | 1/2013 | Yankun | .............. | G06K 9/00805 |
| | | | | 340/435 |
| 2013/0103299 A1* | 4/2013 | Matsuda | ................. | G06F 17/00 |
| | | | | 701/300 |
| 2013/0322692 A1* | 12/2013 | Guan | ................. | G06K 9/00791 |
| | | | | 382/103 |
| 2014/0254872 A1* | 9/2014 | Guan | ................. | G06K 9/00624 |
| | | | | 382/103 |
| 2014/0266803 A1* | 9/2014 | Bulan | ................ | G06K 9/00785 |
| | | | | 340/932.2 |
| 2015/0243043 A1* | 8/2015 | Guan | ....................... | G06T 7/20 |
| | | | | 701/1 |

\* cited by examiner

APPARATUS AND METHOD FOR DETECTING OBJECT FOR VEHICLE

CROSS-REFERENCE TO RELATED APPLICATIONS

The present application claims priority to Korean Patent Application Number 10-2014-0154563 filed Nov. 7, 2014, the entire contents of which application is incorporated herein for all purposes by this reference.

TECHNICAL FIELD

The present invention relates to an apparatus and a method for detecting an object for a vehicle, and more particularly, to an apparatus and a method for detecting an object for a vehicle, which extract an object candidate from a surrounding image of a vehicle, output a filtered image by excluding an object having a height equal to or smaller than a predetermined threshold value, and detect a specific object from the filtered image.

BACKGROUND

Recently, various technologies for photographing, by a vehicle, a surrounding image, detecting an object from the photographed image, and controlling the vehicle according to the detected object have been developed.

However, since the surrounding image of the vehicle is changed in real time, when an algorithm detecting all of the objects within an entire range of the surrounding image of the vehicle is applied, a calculation is inefficient. The inefficient calculation may cause a fatal error in applying the technology, which detects an object in real time and uses the detected object for controlling the vehicle, and may cause a safety accident to a vehicle driver and a pedestrian.

Particularly, there is a problem in that when even a very low object, which is not a detection target, is detected, efficiency of an object detection function is decreased.

Accordingly, research on a method of efficiently detecting an object and further increasing a detection speed has been recently conducted.

SUMMARY

The present invention has been made in an effort to provide an apparatus and a method for detecting an object for a vehicle, which detect only an object having a height equal to or larger than a predetermined threshold value from a surrounding image of the vehicle, thereby improving efficiency of an object detection function.

Objects of the present invention are not limited to the objects described above, and other objects that are not described will be clearly understood by a person skilled in the art from the description below.

An exemplary embodiment of the present invention provides an apparatus for detecting an object for a vehicle, the apparatus including: a camera unit configured to output a surrounding image of a vehicle; an object candidate extracting unit configured to extract an object candidate from the output surrounding image of the vehicle; a height reference filtering unit configured to output a filtered image by excluding an object having a height equal to or smaller than a threshold value from the extracted object candidate; and an object recognizing unit configured to detect a specific object from the output filtered image.

The object candidate extracting unit may calculate center coordinates of a lower end of an object square surrounding the object candidate.

The height reference filtering unit may calculate a variable height threshold value corresponding to the center coordinates of the lower end of the object square surrounding the object candidate.

The height reference filtering unit may calculate coordinates of the object square having a minimum height and a minimum width while changing a position of the object square based on the variable height threshold value in the surrounding image of the vehicle.

The height reference filtering unit may calculate the coordinates of the object square for each region of the surrounding image of the vehicle and store the calculated coordinates in a look-up table.

The height reference filtering unit may calculate the variable height threshold value corresponding to the center coordinates of the lower end of the object square with reference to the look-up table.

Another exemplary embodiment of the present invention provides a method for detecting an object for a vehicle, the method including: outputting a surrounding image of a vehicle; extracting an object candidate from the surrounding image of the vehicle; outputting a filtered image by excluding an object having a height equal to or smaller than a threshold value from the extracted object candidate; and detecting a specific object from the filtered image.

The extracting of the object candidate may include calculating center coordinates of a lower end of an object square surrounding the object candidate.

The outputting of the filtered image may include calculating a variable height threshold value corresponding to the center coordinates of the lower end of the object square surrounding the object candidate.

The outputting of the filtered image may include calculating coordinates of the object square having a minimum height and a minimum width while changing a position of the object square based on the variable height threshold value in the surrounding image of the vehicle.

The outputting of the filtered image may include calculating the coordinates of the object square for each region of the surrounding image of the vehicle and storing the calculated coordinates in a look-up table.

The outputting of the filtered image may include calculating the variable height threshold value corresponding to the center coordinates of the lower end of the object square with reference to the look-up table.

Other detailed matters of the exemplary embodiments are included in the detailed description and the drawings.

The apparatus and method for detecting the object for the vehicle according to the present invention have one or more effects described below.

It is possible to rapidly detect a specific object in a surrounding image of the vehicle by excluding an object having a height equal to or smaller than a threshold value from an extracted object candidate.

It is possible to rapidly apply a height threshold value without an additional separate calculation by calculating coordinates of a square surrounding an object for each region of a surrounding image of the vehicle and storing the calculated coordinates in a look-up table.

The effects of the present invention are not limited to the aforementioned effects, and other effects, which are not mentioned above, will be clearly understood by those skilled in the art from the claims.

DETAILED DESCRIPTION

Figure 1:
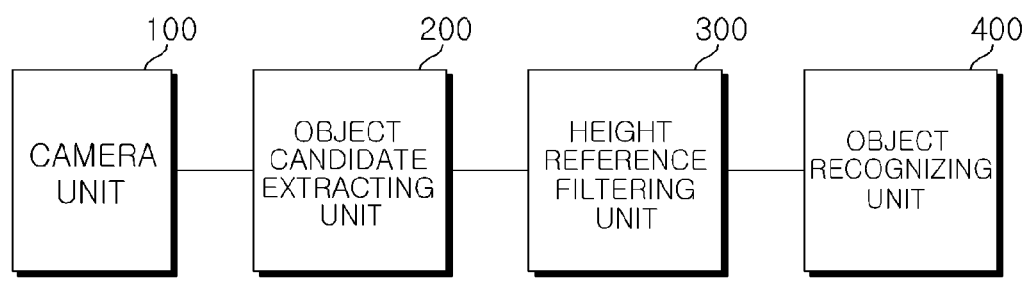
FIG. 1 is a configuration diagram illustrating an object detecting apparatus for a vehicle according to an exemplary embodiment of the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The exemplary embodiments introduced herein are provided to make disclosed contents thorough and complete and sufficiently transfer the scope of the present invention to those skilled in the art, and the present invention will only be defined by the scope of the claims. Like reference numerals indicate like elements throughout the specification.

Hereinafter, the present invention will be described with reference to the drawings for explaining an object detecting apparatus for a vehicle according to exemplary embodiments of the present invention.

FIG. 1 is a configuration diagram illustrating an object detecting apparatus for a vehicle according to an exemplary embodiment of the present invention. The object detecting apparatus for the vehicle according to the exemplary embodiment of the present invention includes a camera unit 100, an object candidate extracting unit 200, a height reference filtering unit 300, and an object recognizing unit 400.

The camera unit 100 outputs a surrounding image of the vehicle and transmits the output surrounding image to the object candidate extracting unit 200. The camera unit 100 is installed at a location, at which a surrounding area of the vehicle may be photographed without hindrance. The camera unit 100 according to the exemplary embodiment may output a front image of the vehicle.

The object candidate extracting unit 200 extracts an object candidate from the front image of the vehicle transmitted from the camera unit 100. The object candidate extracting unit 200 sets a region of interest in the received front image of the vehicle. The object candidate extracting unit 200 extracts an object square, which surrounds the object candidate within the region of interest, by using an image pyramid in a cascade scheme based on an object model. The object candidate extracting unit 200 generates a plurality of image pyramids based on the input front image of the vehicle. The image pyramid generated by the object candidate extracting unit 200 means an image pyramid generated by down sampling the input surrounding image of the vehicle.

The object candidate extracting unit 200 detects the object candidate from each of the plurality of image pyramids by using a scan window, based on the object model. When the object candidate extracting unit 200 detects the object candidate, the object candidate extracting unit 200 calculates similarity between the scan window and a route model and each part model in the input front image of the vehicle, adds each calculated similarity, and detects the object candidate.

The object candidate extracting unit 200 overlaps the plurality of image pyramids, from which the object candidate is detected, into one image. The object candidate extracting unit 200 compares each overlapping object candidate with the object model for each object candidate in one front image of the vehicle, and determines an object candidate having the largest similarity with the object model as a specific object. The object candidate extracting unit 200 removes the object candidates other than the object candidate having the largest similarity with the object model.

The object model in the object candidate extracting unit 200 is generated by learning or a clustering method based on an object image and a non-object image. The object model in the object candidate extracting unit 200 includes a root model, which is a modeled entire shape of the object image and the non-object image, and each part model, which is obtained by dividing the root model into a plurality of parts. The part model in the object candidate extracting unit 200 includes a head part, a body part, and a leg part.

The object candidate extracting unit 200 according to the exemplary embodiment extracts an object candidate from the input front image of the vehicle by using feature tracking. The object candidate extracting unit 200 may extract an object candidate, which continuously appears through the feature tracking, from the object candidates as an object candidate square for a predetermined frame and a next frame of the front image of the vehicle.

The object candidate extracting unit 200 calculates center coordinates of a lower end of the object square surrounding the object candidate. The object candidate extracting unit 200 may calculate center coordinates of a part, at which the object meets the ground, in the object square surrounding the object candidate. This will be described below with reference to FIG. 2.

The height reference filtering unit 300 outputs a filtered image by excluding an object having a variable height threshold value or lower from the extracted object candidate.

The height reference filtering unit 300 extracts the variable height threshold value corresponding to the center coordinates of the lower end of the object square surrounding the object candidate.

The height reference filtering unit 300 according to the exemplary embodiment calculates coordinates of a square having a minimum height and a minimum width while changing a position of the square based on the variable height threshold value in the front image of the vehicle. The height reference filtering unit 300 calculates the coordinates of the square based on the variable height threshold value, which is varied, because the surrounding image of the vehicle output by the camera unit 100 uses a wide angle lens, so that the surrounding image of the vehicle is distorted.

The height reference filtering unit 300 stores the variable height threshold value according to the center coordinates of the lower end of the object square for each region of the surrounding image of the vehicle in a look-up table.

The height reference filtering unit 300 calculates the variable height threshold value of the center coordinates of the lower end of the object square with reference to the look-up table. This will be described in detail with reference to FIG. 2 below.

The object recognizing unit 400 detects a specific object from the filtered image by an object detecting method. The object recognizing unit 400 may perform again a process performed by the object candidate extracting unit 200.

Figure 2A:
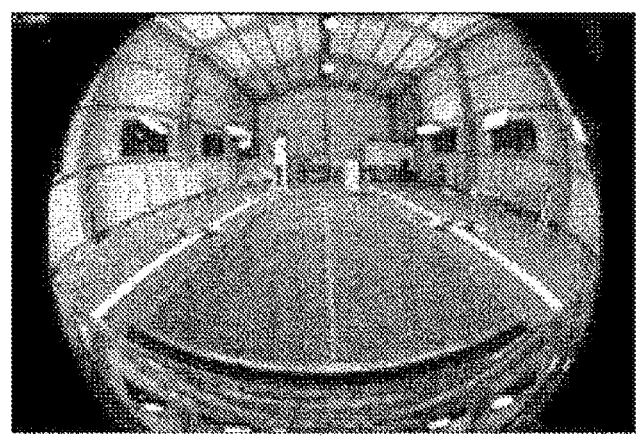
FIGS. 2A to 2C are diagrams illustrating an image output by a camera unit included in FIG. 1, extraction of object squares from the image, and a change in a height according to a position change of the object square.
Figure 2B:
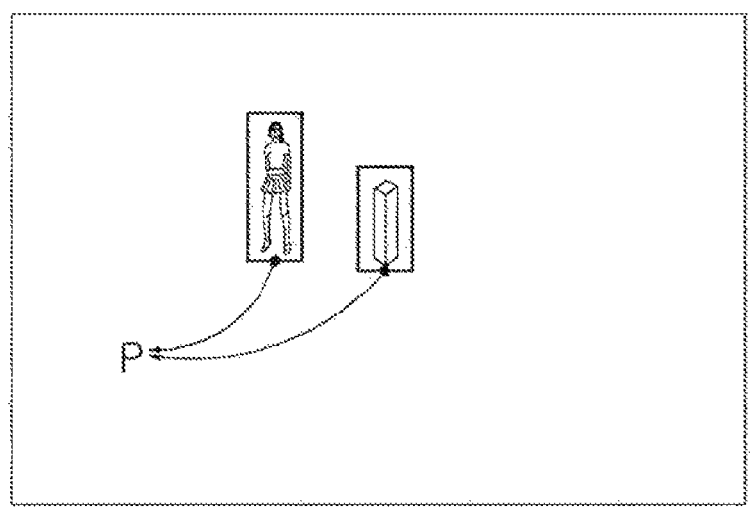
Figure 2C:
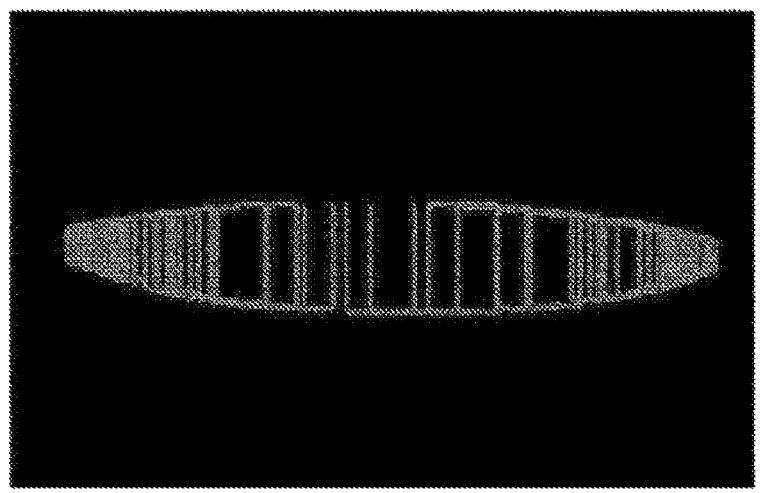

FIGS. 2A to 2C illustrate extraction of center coordinates P of a lower end of an object square from a front image of the vehicle output by the camera unit 100 according to the exemplary embodiment illustrated in FIG. 1. FIGS. 2A and 2B illustrate the front image of the vehicle and extraction of the object squares from the front image of the vehicle. The object candidate extracting unit 200 sets a region of interest in the received front image of the vehicle. The object candidate extracting unit 200 extracts an object square surrounding the object candidate within the region of interest by using an image pyramid in the cascade scheme based on an object model. The object candidate extracting unit 200 calculates center coordinates P of a lower end of the object square surrounding the object candidate. The object candidate extracting unit 200 may calculate the center coordinates P of a part, at which the object meets the ground, in the object square surrounding the object candidate. The front image of the vehicle output by the camera unit 100 generally uses a wide angle lens, so that distortion is generated in a screen, such as an image of FIG. 2A. When the object square surrounding the extracted object candidate is extracted, the height reference filtering unit 300 may change a position of the object square by allowing one point in a 3D space to correspond to one pixel of a 2D image by using parameters inside and outside the camera. The height reference filtering unit 300 moves the object square based on the center coordinates P of the lower end of the object square. The height reference filtering unit 300 may initially set a minimum height and a minimum width of the object square when moving the object square.

When the height reference filtering unit 300 changes the position of the object square, the position of the object square is changed according to image coordinates, so that a size of the object square may also be automatically changed. The height reference filtering unit 300 stores the coordinates of the object square in the look-up table according to a coordinate system of the image while changing the position of the object square in all of the regions of the screen based on the initially set minimum height and minimum width of the object square. FIG. 2C illustrates a state where a height threshold value of the object square is changed according to the change of the position of the object square in a predetermined region by the height reference filtering unit 300 according to the exemplary embodiment.

The specific object detecting apparatus according to the exemplary embodiment is not limited to the front image of the vehicle, and the specific object may be detected for at least one of a lateral image of the vehicle and a rear image of the vehicle.

Figure 3:
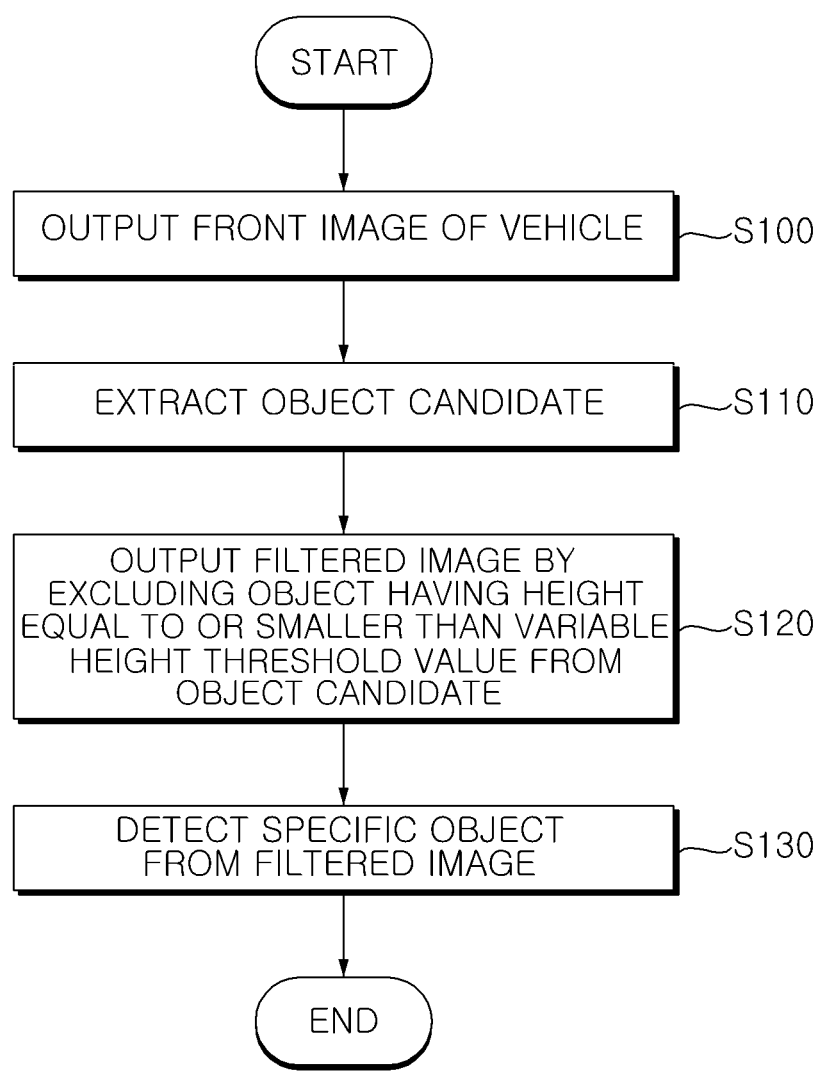
FIG. 3 is a flow chart illustrating an object detection method for a vehicle according to an exemplary embodiment of the present invention.

An operation of a specific object detecting method according to the present invention, which is configured as described above, will be described below with reference to FIG. 3. FIG. 3 is a control flow chart illustrating a control flow of a specific object detecting method according to the exemplary embodiment by the configuration of FIG. 1.

The camera unit 100 according to the exemplary embodiment outputs a front image of the vehicle to the object candidate extracting unit 200 (S100).

The object candidate extracting unit 200 extracts an object candidate from the front image of the vehicle (S110). The object candidate extracting unit 200 sets a region of interest in the received front image of the vehicle and extracts an object square.

The object candidate extracting unit 200 calculates center coordinates of a lower end of the object square surrounding the object candidate. The object candidate extracting unit 200 sets the region of interest in the received front image of the vehicle, and calculates the center coordinates of the lower end of the object square by using an image pyramid in the cascade scheme.

The height reference filtering unit 300 calculates a variable height threshold value corresponding to the center coordinates of the lower end of the object square surrounding the object candidate. The height reference filtering unit 300 calculates coordinates of a square having a minimum height and a minimum width while changing a position of the square based on the variable height threshold value in the front image of the vehicle. The height reference filtering unit 300 calculates coordinates of the object square for each region of the front image of the vehicle and stores the calculated coordinates in the look-up table. The height reference filtering unit 300 calculates the variable height threshold value of the center coordinates of the lower end of the object square with reference to the look-up table.

The height reference filtering unit 300 outputs a filtered image by excluding an object having the variable height threshold value or lower from the extracted object candidate (S120).

The object recognizing unit 400 detects a specific object from the filtered image (S130). The object recognizing unit 400 detects the specific object from the filtered image by an object detecting method. The object recognizing unit 400 may perform again a process performed by the object candidate extracting unit 200.

The specific object detecting method according to the exemplary embodiment is not limited to the front image of the vehicle, and the specific object may be detected for at least one of a lateral image of the vehicle and a rear image of the vehicle.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An apparatus for detecting an object for a vehicle, the apparatus comprising:
 a camera unit configured to output a surrounding image of a vehicle; and
 a circuitry configured to:
  set a reference square having a minimum height and a minimum width on the surrounding image,
  calculate center coordinates of a lower end of the reference square in each region of the surrounding image and a height threshold value which is variable according to the center coordinates of the lower end of the reference square, while moving the reference square on all regions of the surrounding image,
  store height threshold values each corresponding to each center coordinates of the lower end of the reference square in a look-up table,
  set an object square surrounding an object candidate on the surrounding image of the vehicle,
  calculate center coordinates of a lower end of the object square,
  output a filtered image by extracting the height threshold value corresponding to center coordinates of the lower end of the object square from the look-up table and excluding an object having a height equal to or smaller than the height threshold value corresponding to the center coordinates of the lower end of the object square from the object candidate on the surrounding image of the vehicle, and detect a specific object from the output filtered image.

2. A method for detecting an object for a vehicle, the method comprising:

outputting a surrounding image of a vehicle;

setting a reference square having a minimum height and a minimum width on the surrounding image;

calculating center coordinates of a lower end of the reference square in each region of the surrounding image and a height threshold value which is variable according to the center coordinates of the lower end of the reference square, while moving the reference square on all regions of the surrounding image;

storing height threshold values each corresponding to each center coordinates of the lower end of the reference square in a look-up table;

setting an object square surrounding an object candidate on the surrounding image of the vehicle;

calculating center coordinates of a lower end of the object square;

outputting a filtered image by extracting the height threshold value corresponding to center coordinates of the lower end of the object square from the look-up table and excluding an object having a height equal to or smaller than the height threshold value corresponding to the center coordinates of the lower end of the object square from the object candidate on the surrounding image of the vehicle; and detecting a specific object from the filtered image.

* * * * *